July 5, 1955 — G. C. HENRY — 2,712,179
MOTION TRANSMITTING DEVICE
Filed April 30, 1954 — 4 Sheets-Sheet 1

Inventor:
Glenn C. Henry,
by Abbot Spear
Attorney

July 5, 1955
G. C. HENRY
2,712,179
MOTION TRANSMITTING DEVICE
Filed April 30, 1954
4 Sheets-Sheet 2
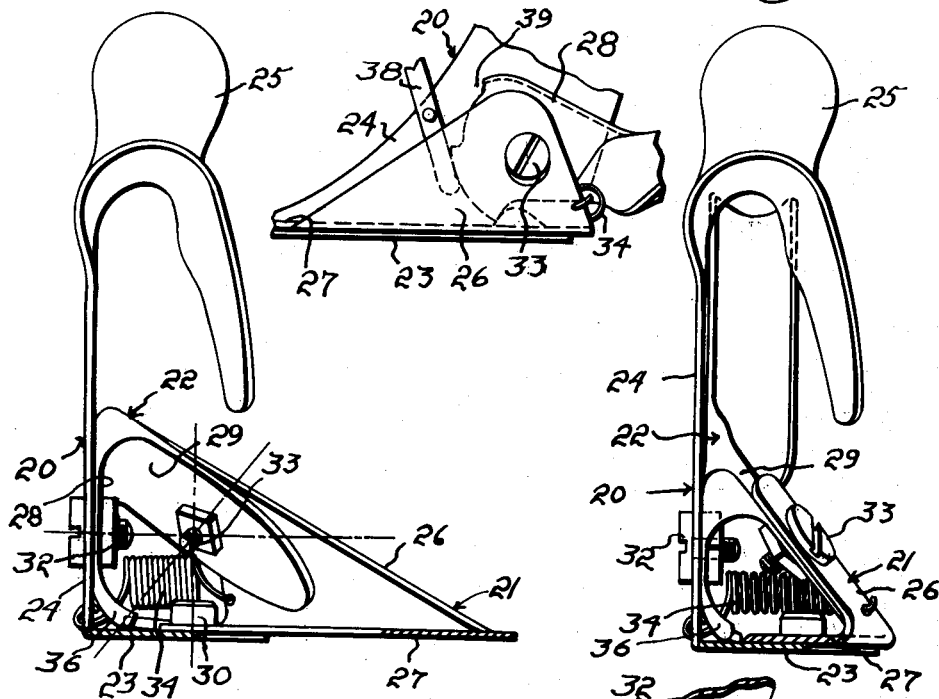
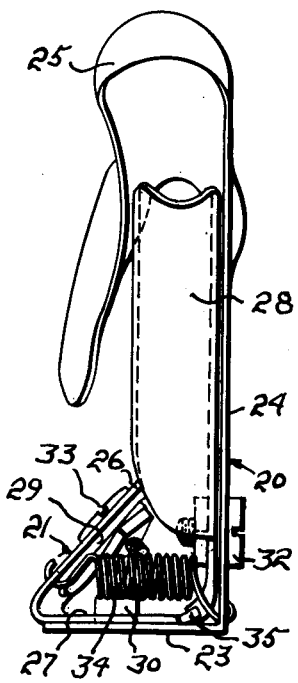
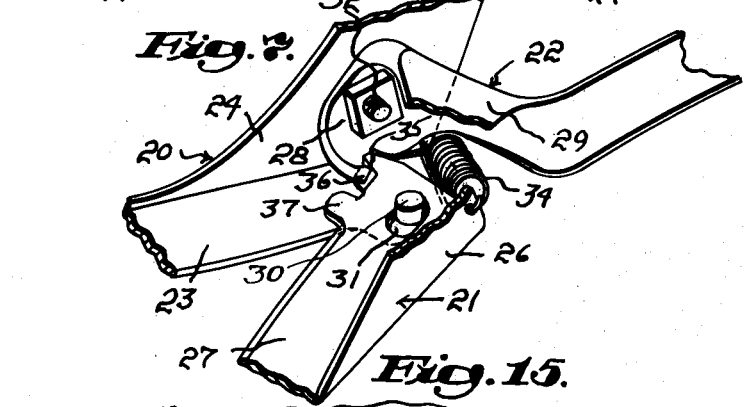
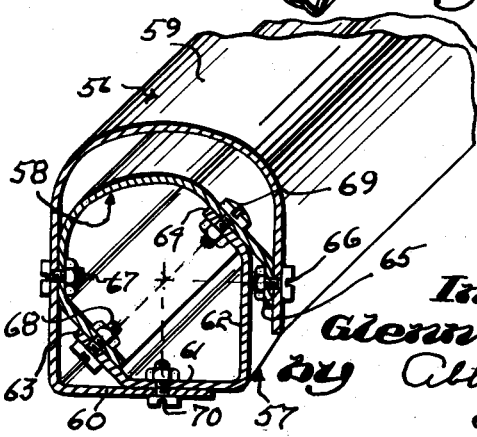
Inventor:
Glenn C. Henry,
by
Attorney July 5, 1955            G. C. HENRY            2,712,179
MOTION TRANSMITTING DEVICE
Filed April 30, 1954            4 Sheets-Sheet 3
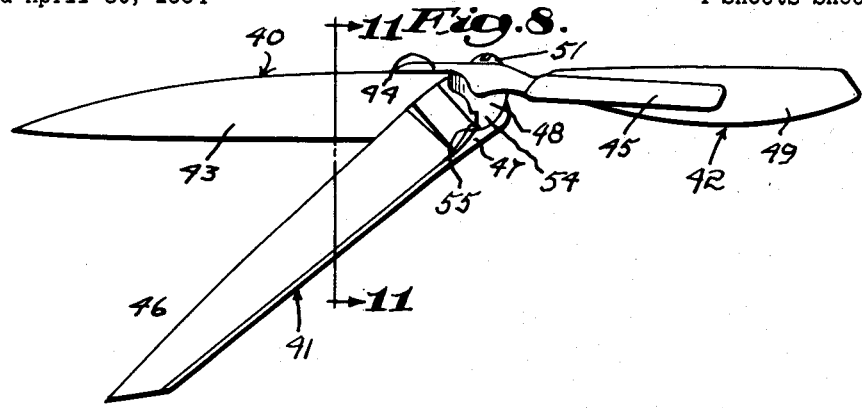
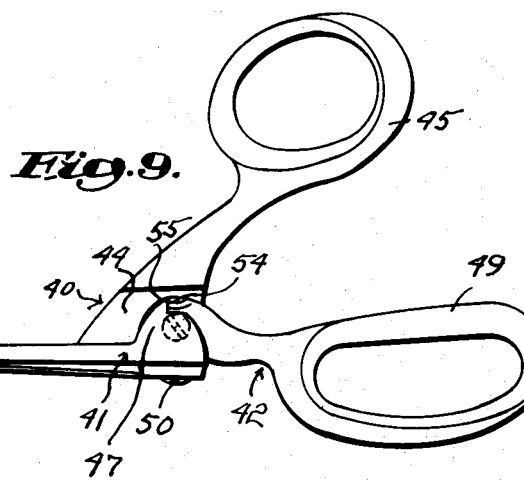
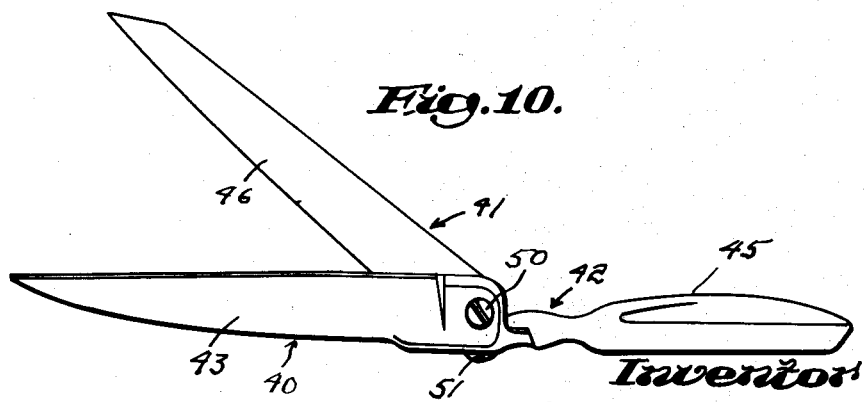
Inventor:
Glenn C. Henry,
by
Attorney July 5, 1955 — G. C. HENRY — 2,712,179
MOTION TRANSMITTING DEVICE
Filed April 30, 1954 — 4 Sheets-Sheet 4

Inventor:
Glenn C. Henry,
by Albert Spear
Attorney

United States Patent Office 2,712,179
Patented July 5, 1955

2,712,179

MOTION TRANSMITTING DEVICE

Glenn C. Henry, Otisfield, Maine

Application April 30, 1954, Serial No. 426,672

15 Claims. (Cl. 30—248)

This invention relates to motion transmitting devices and particularly to those where oscillatory motion is transmitted angularly from one plane to another.

While the invention is adapted to a wide range of uses, its novel features and advantages may be readily understood with reference to tools, particularly clippers and shears, of the type wherein the pivot axis of the operating handles is angularly disposed with reference to the pivot axis of the blades.

In accordance with the invention, a motion transmitting device consists of first, second, and third members so connected that the second and third members oscillate relative to the first member in intersecting planes with oscillation of the third member relative to the first member resulting in oscillation of the second member relative to the first member. The axes of oscillation of the members intersect at a common point, by which expression is meant that the axes approximately intersect at approximately a common point.

Such motion transmitting means meet the general objective of this invention in that they enable simplicity and ruggedness of construction to be combined with ease of operation and adaptability for a wide range of uses.

One of the features of the invention that is important in such cutting devices as clippers and shears, is that self-tensioning blades are provided. This results because, during operation, the force exerted may be resolved into two components with respect to the blades with one component causing the blades to swing relative to their axis and the other forcing the blades into close cutting contact. With one of the blades having a slot in parallel with its cutting edge to receive the pivot, blade tension can be made dependent only on the operating pressure applied to the handles. This is of particularly marked importance where a spring is employed to open the blades as the operating force is opposed by the spring tension as well as by the resistance of the material being cut.

In the accompanying drawings, there are shown illustrative embodiments of the invention from which these and other of its objectives, novel features, and advantages will be readily apparent.

Figure 1:
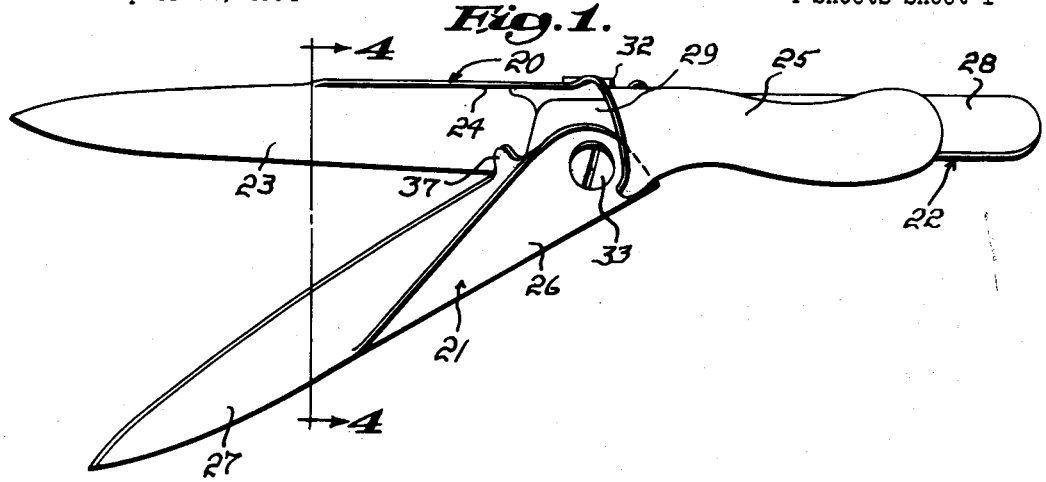
Fig. 1 is a top elevational view of a grass clipper in accordance with the invention.
Figure 2:
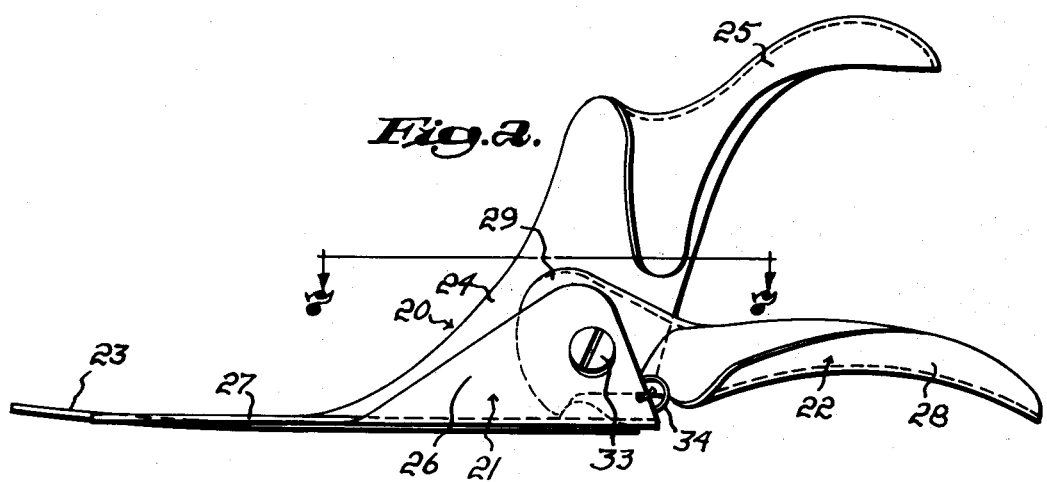
Figs. 2 and 3 are, respectively, side and bottom views thereof.

Fig. 2ª is a fragmentary side view of a grass clipper provided with blade locking means.

Figure 3:
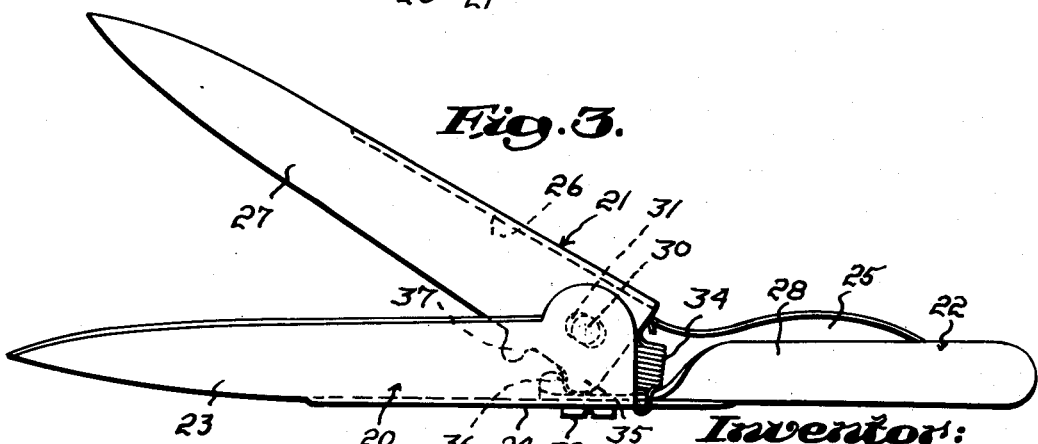

Fig. 4 is a section taken along the indicated lines 4—4 of Fig. 3.

Fig. 5 is a view similar to Fig. 4, but with the blades closed.

Fig. 6 is a view of the clipper in that position as seen from the handle end.

Fig. 7 is a fragmentary view, in perspective, partly broken away to show the connections between the members more clearly.

Fig. 8 is a top elevation of a pair of shears in accordance with the invention.

Figs. 9 and 10 are similar side and bottom views.

Figure 11:
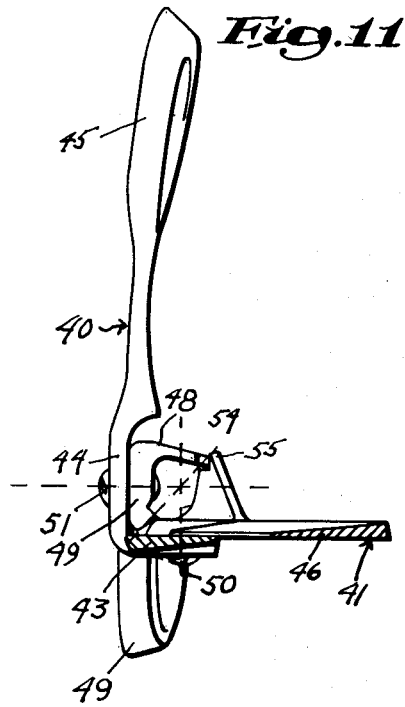

Fig. 11 is a section taken along the indicated lines 11—11 of Fig. 8.

Figure 12:
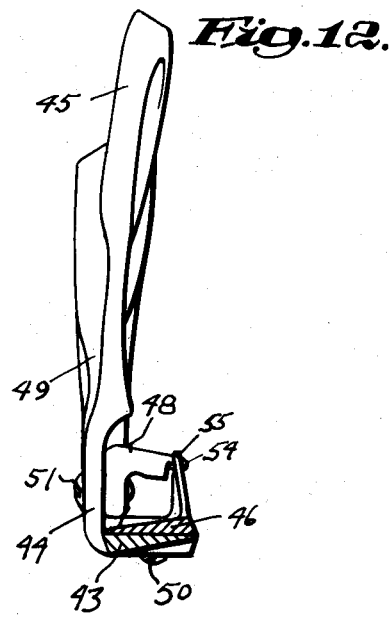

Fig. 12 is a similar view, but with the blades closed together.

Figure 13:
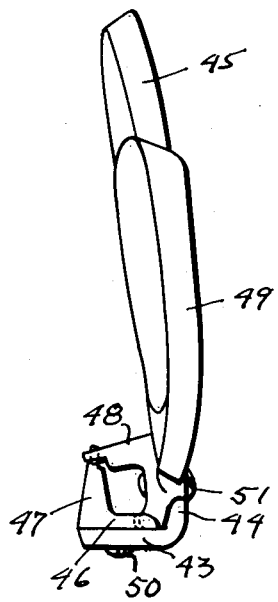

Fig. 13 is a view of the shears as seen from the handle end with the baldes closed together.

Figure 14:
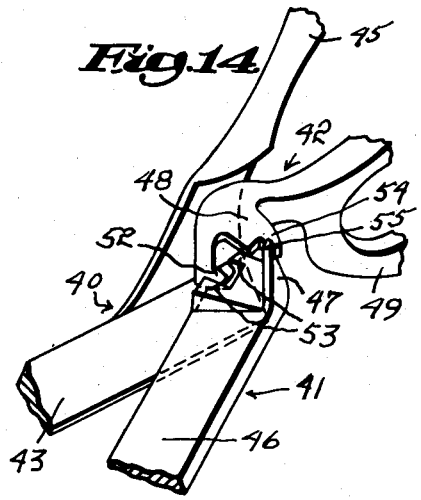

Fig. 14 is a fragmentary, perspective view, and

Fig. 15 is a fragmentary section illustrating another embodiment of the invention.

In Figs. 1–7, there is shown grass clippers in accordance with the invention and comprising three members, generally indicated at 20, 21, and 22. Each of these members includes angularly disposed portions. In the case of the member 20, these portions are indicated at 23 and 24 with the member 23 comprising a blade and the member 24 including a rearwardly extending part 25 which is formed to establish a handle. The member 21 has its angularly disposed portions indicated at 26 and 27 with the portion 27 being a second blade. Of the angularly disposed portions 28 and 29 of the member 22, the portion 28 is shaped to establish a second handle.

The blade 27 is pivotally connected to the blade 23 as by means of a pivot pin 30 entrant of a slot 31 disposed in parallel with the proximate cutting edge. The second handle 28 is pivotally connected as at 32 to the part 24 of the member 20 and the portions 29 and 26 of the members 23 and 22, respectively, are united by a pivot 33. The axes of these pivots all are shown as intersecting at a common point.

In the grass clippers described, the blades are interconnected, rearwardly of their pivotal connection, by a spring 34 which yieldably urges the blades towards their open position. In addition, the blade 27 of the member 21 and the portions 29 of the member 22 are formed with coacting teeth 35 and 36 respectively which engage along a line which approximately intersects said common point. The blade 27 also is provided with a stop 37 engageable with the part 24 of the member 20 when the blades are closed together to a predetermined extent.

It will be appreciated that when the handle 28 oscillates relative to the handle 25, the blade 27 oscillates relative to the blade 23 with assistance being rendered by the coaction of the teeth 35 and 36. Because of the loose pivotal connection between the blades 23 and 27, it will be noted that there may be little, if any, blade tension except when the blades are closed together. This results because the then exerted force tends to turn the blade 27 relative to its axis and to force it into close cutting relationship to the blade 23.

As the blades 23 and 27 are urged towards their open position by the spring 34, it is desirable to provide means whereby they may be locked closed. This may be accomplished, as shown in Fig. 2ª, by pivotally mounting on the part 24 of the member 20, a lock 38 adapted to swing or be swung into position to enter the recess 39 in the part 28 when the handles are actuated to close the blades and thus hold the blades closed against the opening action of the spring 34.

In Figs. 8–14, shears in accordance with the invention are shown as comprising three members generally indicated at 40, 41, and 42. Each such member includes a a pair of angularly disposed portions. Those portions of the member 40 are indicated at 43 and 44 with the member 43 being a blade and the portion 44 having a digitally engageable handle 45. Of the angular portions 46 and 47 of the member 41, the portion 46 is the second blade. The angular portions of the member 42 are indicated at 48 and 49 with the portion 49 being the second digitally engageable handle.

The blades 43 and 46 are pivotally connected as at 50 and a pivot 51 interconnects the portions 44 and 49 of the members 40 and 42, respectively. It will also be noted that the portion 49 and the proximate part of the blade 46 have coacting teeth 52 and 53 while the portions 48 and 47 also are provided with coacting teeth 54 and 55. These teeth, as may best be seen in Figs. 11–13, define an axis which approximately intersects the axes of the pivots 50 and 51 at an approximately common point.

With reference to the embodiment of the invention illustrated by Fig. 15, the three members are indicated generally at 56, 57, and 58. The member 56 consists of a channel portion 59 which may be considered as a handle, and a portion 60 angularly disposed with reference to one of the parallel channel walls. The portion 60 may be considered as being part of a blade.

The member 57 includes angularly disposed portions 61 and 62 terminating in parallel margins 63 and 64 while the member 58 is of approximately U-shaped section with one of its parallel sides including a portion 65 angularly disposed to be parallel to one of the walls of the channel portion 59 to which it is connected by the pivot 66 transversely alined with the pivot 67 connecting the portion 58 to the other wall of the channel portion 59.

The sides of the member 58 are pivotally connected as at 68 and 69 to the margins 63 and 64, respectively, of the member 57 whose portion 61 is connected to the portion 60 of the member 56 as by the pivot 70. It will be noted that all axes are shown as intersecting at a substantially common point. This mechanism operates in the same manner as the previously described shears and clippers in that oscillation of the members 56 and 58 being attended by oscillation of the portions 60 and 61.

From the foregoing, it will be appreciated that motion transmitting devices in accordance with the invention are adaptable to a wide range of uses.

What I therefore claim and desire to secure by Letters Patent is:

1. In a motion transmitting device, first, second and third connected members, said first member having intersecting axes with reference to each of which a respective one of said other members oscillates, the mutual oscillation of said other members being with respect to an axis which approximately intersects said other axes at a common point.

2. In a motion transmitting device, first, second and third connected members, said first member having intersecting axes with reference to each of which a respective one of said other members oscillates, the mutual oscillation of said other members being with respect to an axis which approximately intersects said other axes at a common point and said second and third members including portions coacting and interengaging in a zone approximately inclusive of their common axis.

3. In a tool, first, second and third connected members, said first member including a working part and a handle, said second member including a second working part, said third member including a second handle, said first member having intersecting axes with reference to each of which a respective one of said other members oscillates, the mutual oscillation of said other members being with respect to an axis which approximately intersects said other axes at a common point.

4. In a motion transmitting device, first, second and third members and pivot means interconnecting each member to the others, the axes of said pivot means approximately intersecting at a common point.

5. In a motion transmitting device, first, second and third connected members, pivot means interconnecting each member to the others, the axes of said pivot means approximately intersecting at a common point, and two of said members including teeth interengaging and coacting in a zone inclusive of their common axis.

6. In a tool, first, second and third members, said first member including a handle and a working part, said second member including a second handle, said third member including a second working part, and pivot means interconnecting each member to the others, the axes of said pivot means approximately intersecting at a common point, the pivot means between two of said members including a fixed pin carried by one of them, the other of said two members having a pin receiving slot.

7. In a cutting device, a first member including a blade and a handle, a second member including a second handle, a third member including a second blade, and pivot means interconnecting each member to the others, the axes of said pivot means approximately intersecting at a common point, the pivot means between said first and third members comprising a pin carried by one of them and the other member having a slot freely receiving said pin and approximately parallel to the cutting edge of its blade.

8. A tool comprising a first member including a portion of V-shaped section, a handle and a working element connected to corresponding parts of said portion, a second member including a portion of V-shaped section and a handle connected to one part of said portion, a third member including a portion of V-shaped section and a working element connected to one part of said portion, said members being pivotally interconnected to the others in the zone of their sections and forming a triangular structure of which each V-shaped section constitutes one angle, the pivot axes approximately intersecting at a common point.

9. O tool comprising a first member including a portion of V-shaped section, a handle and a working element connected to corresponding parts of said portion, a second member including a portion of V-shaped section and a handle connected to one part of said portion, a third member including a portion of V-shaped section and a working element connected to one part of said portion, said members being pivotally interconnected to the others in the zone of their sections and forming a triangular structure of which each V-shaped section constitutes one angle, the pivot axes approximately intersecting at a common point, parts of two of the V-shaped sections including teeth interengaging and coacting in the zone approximately inclusive of their axis.

10. A tool comprising a first member including a portion of V-shaped section, a handle and a working element connected to corresponding parts of said portion, a second member including a portion of V-shaped section and a handle connected to one part of said portion, a third member including a portion of V-shaped section and a working element connected to one part of said portion, said members being pivotally interconnected to the others in the zone of their sections forming a triangular structure of which each V-shaped section constitutes one angle, the pivot axes approximately intersecting at a common point, a lock carried by one part of the V-shaped section of one member for movement into and out of an operative position, the part of an adjacent member that is pivotally connected to said lock carrying part having a recess entered by said lock in its operative position when said members have oscillated in one direction to a predetermined extent, and means interconnecting two of said members and yieldably urging their oscillation in the opposite direction.

11. A tool comprising a first member including a portion of V-shaped section, a handle and a working element connected to corresponding parts of said portion, a second member including a portion of V-shaped section and a handle connected to one part of said portion, a third member including a portion of V-shaped section and a working element connected to one part of said portion, pivot means interconnecting said members in the zone of their sections and forming a triangular structure of which each V-shaped section constitutes one angle, the pivot axes approximately intersecting at a common point, the pivot means between the parts of the first and third members that include working elements comprising a fixed pin carried by one part and the other part having a pin receiving slot.

12. A tool comprising a first member including a portion of V-shaped section, a handle and a working element connected to corresponding parts of said portion, a second member including a portion of V-shaped section and a handle connected to one part of said portion, a third member including a portion of V-shaped section and a working element connected to one part of said portion, said members being pivotally interconnected to the others in the zone of their sections and forming a triangular structure of which each V-shaped section constitutes one angle, the pivot axes approximately intersecting at a common point, one portion of one section including a stop engageable with the adjacent portion of another section to limit the extent to which said portions may swing towards each other.

13. In a motion transmitting device, three members, each including angularly disposed portions, pivot means carried by said portions and connecting them for oscillation along axes which approximately intersect at a common point.

14. In a motion transmitting device, three members, each including angularly disposed portions, pivot means connecting said portions for oscillation along axes which approximately intersect at a common point, both portions of two of said members including teeth interengaging and coacting in the zone approximately inclusive of their common axis.

15. In a motion transmitting device, a first member of V-shaped section with one wall turned inwardly to provide a marginal portion, a second member of V-shaped section, both of whose walls are inturned and parallel, and a third member including first and second pairs of parallel portions, the first pair being pivotally connected to the parallel portions of the first member and the second of which are pivotally connected to the sides of said first member, the pivot axis approximately intersecting at a common point.

No references cited.